Sept. 20, 1971             J. B. GILSTRAP             3,605,619
CREDIT CARD WITH INFORMATION BEARING EDGES
Filed Sept. 25, 1968                                         2 Sheets-Sheet 1
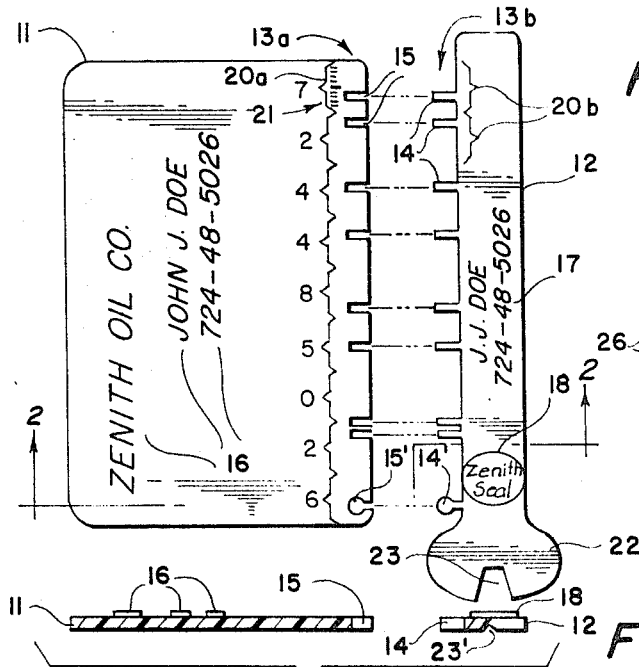
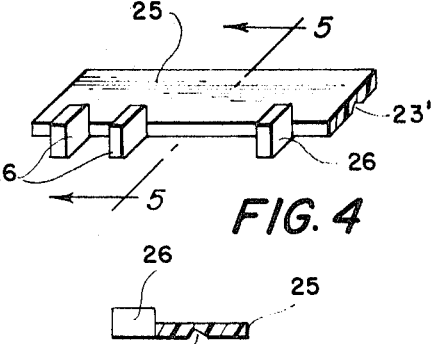
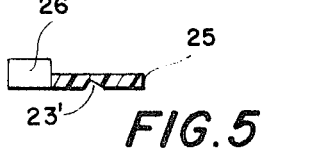
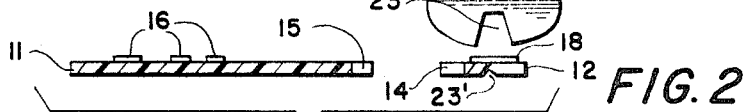
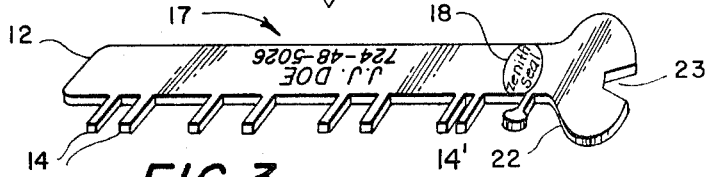
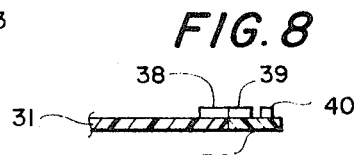
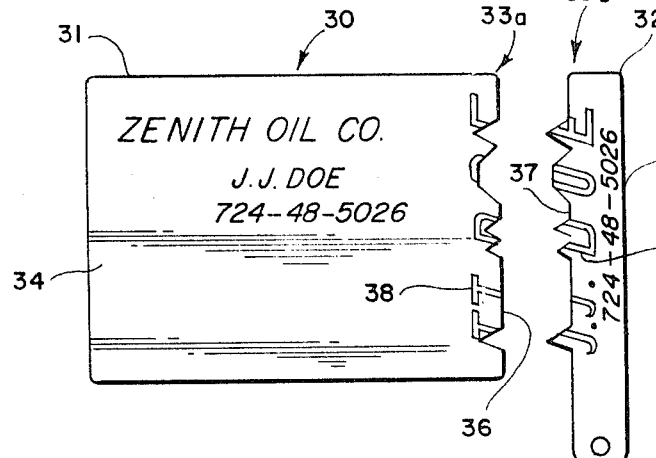
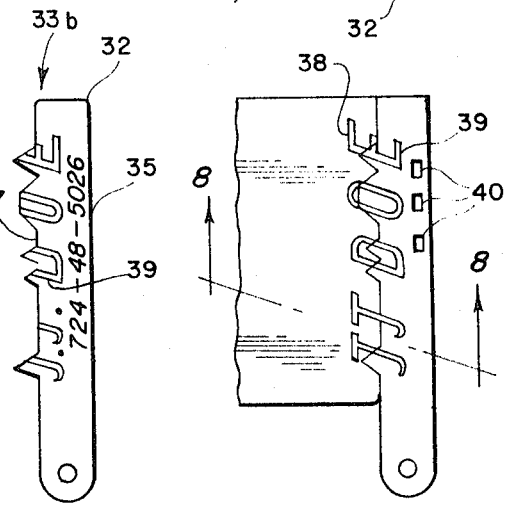
INVENTOR
JAMES B. GILSTRAP
BY *Larson and Taylor*
ATTORNEYS

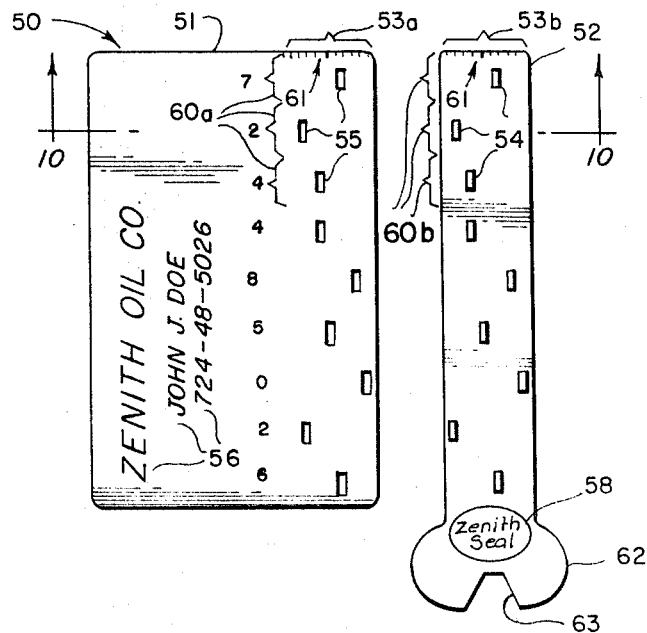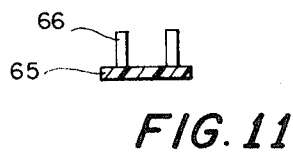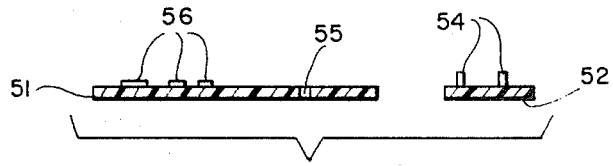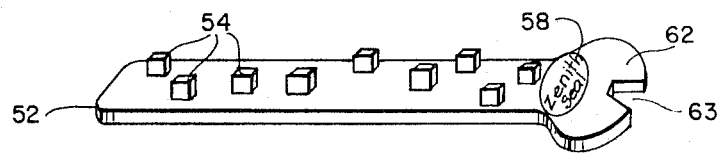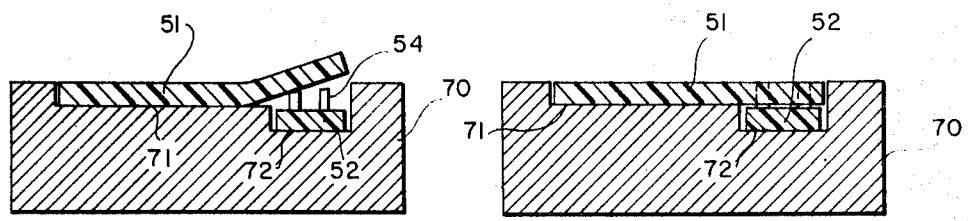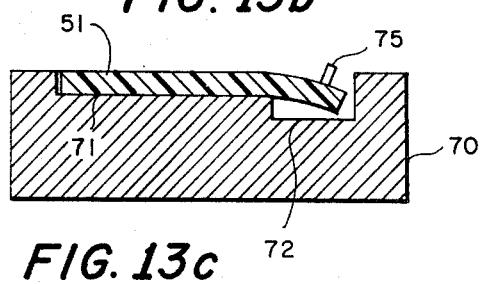

United States Patent Office 3,605,619
Patented Sept. 20, 1971

3,605,619
CREDIT CARD WITH INFORMATION BEARING EDGES
James B. Gilstrap, 8440 Thames St., Springfield, Va. 22151
Filed Sept. 25, 1968, Ser. No. 762,421
Int. Cl. B41l 45/02; B41n 1/00; G09f 3/02
U.S. Cl. 101—368                                    5 Claims

ABSTRACT OF THE DISCLOSURE

A credit card formed in two parts including a main part and a key part, each part having a specially formed field section, wherein the two field sections must be properly mated together for the credit card to appear correct and/or be operative for effecting a credit transaction.

BACKGROUND

This invention relates to credit cards; and in particular it relates to a means for eliminating the financial loss which results from the unauthorized use of credit cards.

A major phenomenon in the commercial field during the last ten to twenty years has been the amazing growth in the use of physical identification cards, commonly referred to as "credit cards" for effecting credit transactions. Today it is estimated that approximately 3,000 separate types of credit cards are in use in the United States alone. Perhaps the single most important reason for the success of credit cards is that merchants find it more profitable in the long run to honor credit cards without question rather than require rigid identification with every purchase. Stated differently, the entire credit card phenomenon is based in large part on trust. However, it is apparent that this very reliance creates a situation wherein persons using credit cards may be subjected to tremendous loss or liability resulting from the loss of a credit card. In some instances, the owner of the credit card is personally liable for whatever charges are made with this card. Alternatively, if a company promises to reimburse merchants for all purchases made with any card which they honor, the company itself can be placed in a very serious financial position. In addition any company employing credit cards must sustain administrative procedures which serve to process notifications by card users to the effect that a card is lost or stolen and to notify field activities as to the invalidity of transactions involving such a credit card.

Although it is of course possible for a person to produce a counterfeit credit card, by far the overwhelming problem is the loss which arises from the use of stolen or lost credit cards.

Thus, there exists a need for a credit card characterized by a means for preventing unauthorized use of the same.

SUMMARY OF THE INVENTION

A purpose of the present invention is to provide a new and improved credit card including a means for preventing unauthorized use of the same. With such a means, the credit card is more adaptable than conventional credit cards for use as a universal credit card.

This purpose of the present invention is carried out by providing a credit card constructed in a plurality of separable parts, for example two parts, a main part and a key part, each part having a specially formed field section, wherein the two field sections must be properly mated together for the credit card to appear correct and/or or be operative for effecting a credit transaction. Preferably, one part would be generally flat and adapted to be stored in a wallet or the like, and the other part would preferably be elongated and adapted to be stored on a key chain or the like.

There are numerous preferred forms of the invention. For example, the two parts may both be flat, one part including lateral projection which mate with openings in the edge of the other part. The position of the mating projections and openings may be selected at random or made to correspond to information which would identify the owner (such as the owner's name or/and identification number such as a social security number). In another form of the invention wherein the two parts are generally flat, the mating edges can be formed of any irregular shape, and the identifying information such as the name or number of the owner could be embossed and made to straddle the two parts so that the identifying information would not appear complete until the two parts had been properly placed into mating engagement with each other.

In another form of the invention, the main part could include a plurality of recesses in the bottom thereof or a plurality of apertures passing therethrough, and the key part could include a plurality of raised nibs which would engage the recesses or pass through the openings. In use, the key would be placed below the credit card in the credit card invoice machine; and if the nibs and recesses or openings did not properly mate, or if no key were placed below the main part of the credit card, the machine would not operate properly to record the necessary information.

The various forms of the invention may be further modified in accordance with the desired mode of operation. For example, the projections appropriately arranged to a desired space-proportioning scheme adaptable for for such use may be raised above the level of the main part for automatic data processing; the main part may be rectangular and adapted to mate with the key part along either its long or its short edge.

Thus, it is an object of this invention to provide a new and improved credit card designed to reduce or eliminate unauthorized transactions.

It is another object of this invention to provide an identification card such as a credit card or the like formed in a plurality of parts, which parts must be properly mated together for the card to appear correct and/or to be operative for effecting the transaction.

It is another object of this invention to provide an identification card such as a credit card or the like having a generally flat main part adapted to be stored in a wallet or the like and generally elongated key part adapted to be stored in a key chain or the like, wherein the two parts must be properly mated together in order to effect the transaction.

Another object of this invention is the space saving feature of having automatic data processing symbols appear on the key only minimizing the bulk of carrying several credit cards separated by ADP embossed representations of name, number, etc.

It is another object of this invention to provide a two-part credit card or the like which must be properly mated together in order to effect the transaction, and wherein the mating portions include raised nibs for automatic data processing.

Other objects and the attendent advantages of the present invention will become apparent from the detailed description to follow, taken together with the accompanying drawings.

BRIEF DESCRIPTION OF THE DRAWINGS

There follows a detailed description of the preferred embodiments of the present invention to be read to- FIG. 1 illustrates an identification card such as a credit card constructed in accordance with the features of the present invention.

FIG. 2 is a sectional view taken along line 2—2 of FIG. 1.

FIG. 3 is a perspective view showing a portion of FIG. 1.

FIG. 4 is a partial perspective view similar to FIG. 3 but showing a modification thereof.

FIG. 5 is a sectional view taken along line 5—5 of FIG. 4.

FIG. 6 is a plan view showing a modified form of the invention.

FIG. 7 is a partial view similar to FIG. 6 but showing the embossed parts properly mated together.

FIG. 8 is a sectional view taken along line 8—8 of FIG. 7.

FIG. 9 is a plan view showing another embodiment of the invention.

FIG. 10 is a sectional view taken along line 10—10 of FIG. 9.

FIG. 11 is a sectional view similar to FIG. 10 but showing a modification thereof.

FIG. 12 is a perspective view of a portion of the embodiment shown in FIGS. 9 and 10.

FIGS. 13a, 13b, and 13c show the embodiment of FIGS. 9 through 12 in use in an invoice machine.

DETAILED DESCRIPTION OF THE PREFERRED EMBODIMENTS

In the drawings, like numerals are employed to indicate like elements throughout.

Referring to FIGS. 1 through 3 there is shown a first embodiment of the invention in the form of a credit card 10 formed in two parts, namely a main portion 11 and a key portion 12. The two portions 11 and 12 include mating field section designated generally as 13a and 13b respectively. In this embodiment projections in the form of laterally extending teeth are formed on the key portion 12 and indented notches are formed on the edge of the main portion 11. The teeth are aligned with the notches so that in use the teeth will project into the notches. The invoicing machine (not shown), in which the credit card is to be used, can be constructed with a recess having a width equal to the total width of the main portion and the key portion. Consequently, if the teeth do not fit into the notches, then the credit card will not fit into the recess in the invoicing machine. Consequently, the machine will not operate and the transaction cannot be carried out.

In the customary manner, the credit card might include embossed information 16 on the main portion. In addition, or in lieu thereof, information may be embossed on the key portion as indicated at 17. As an additional fraud preventive measure, the company seal (presumably very difficult to duplicate in the prescribed standard metal material) could be embossed on the key portion.

In practice, one would carry the main portion 11 in his wallet and the key portion 12 on his key chain. While a person could conceivably lose both his wallet and his key chain at the same location, or have both items stolen concurrently, it is far more likely that if a loss or theft does occur, that the loss or theft would concern only one of the two items, and more frequently the wallet containing the main portion of the credit card. Thus, a person thereby obtaining unauthorized possession of the main portion 11 would be unable to use the same in the absence of the key portion 12. Of course it is conceivable that a particularly unscrupulous person could attempt to counterfeit a key portion. However, this is not a major problem since the owner would probably have reported the loss of the credit card before the unauthorized possessor of the main portion could successfully duplicate a key portion. In addition, further steps could be taken to make it virtually impossible for an unauthorized possessor of the main portion to successfully counterfeit the key portion. For example, the company seal would normally be extremely difficult to counterfeit. Moreover, the edge of the main portion could be made with superfluous "dummy" slots which do not have a corresponding mating tooth on the correct key. Presumably a counterfeiter would include a key for the dummy slot. The merchant, recognizing that the dummy slot is filled would immediately realize that the key is a counterfeit.

While a main purpose of the invention is achieved by any random arrangement of matching teeth 14 and notches 15, in practice these notches can be located in the manner which is correlated to data which would identify the owner; for example the data could consist of a plurality of discrete datum which represent the owner's social security number, the letters in his last name, etc. For this purpose, the field sections 13a and 13b may be divided into subdivisions 20a and 20b, respectively. One notch would be located within each subdivision, and the notch could have ten possible positions within that subdivison, as indicated at 21 in FIG. 1. The position of the notch would be determined by the location of its center line and would represent the datum corresponding to that subdivision. For example, in FIG. 1 the mating fields 13a and 13b each include nine subdivisions. Assuming that the number given at 16 and 17 is the social security number of Mr. John J. Doe, the owner of the card, then the 9 subdivisions would represent 9 discrete datum the first through the ninth numbers of the owner's social security number. As illustrated in FIG. 1 the uppermost notch is located within its subdivision at a position corresponding to the number 7; the notch in the second subdivision is located at a position corresponding to the number 2. Similarly, the first and second projecting teeth on the key portion 12 are located at positions representing the numbers 7 and 2 respectively. The same holds true with the remainder of the subdivisions on both the main portion and the key portion. Of course the notches may be positioned to show any information. For example, the notches could represent letters instead of numbers thereby spelling out the name of the credit card owner. For example, the twenty-six letters of the alphabet could be placed into ten groups of two or three letters and each position 21 could represent one of these groups. Alternatively, the subdivision could be arranged in pairs wherein each pair would include a sufficient number of combinations to specify a particular one of the twenty-six letters in the alphabet.

The key could include a head portion 22 having a slot 23 or cleavage 23' formed therein which slot or cleavage would mate with a projection or ridge in the invoicing machine into which the key must fit properly in order to effect the credit transaction. The size, shape and head of the key in any embodiment to serve the purpose of space-saving; advertising or unique design generally adaptable as a prestige symbol. An example of the latter might be a design in precious metal etc.

FIGS. 4 and 5 illustrate a modification of the embodiment of FIGS. 1 through 3 wherein the key portion 25 is constructed with raised teeth 26 which cause a mark to be placed on the invoice at the same time the embossed information is placed onto the invoice. This mark could be used for sorting the invoices at a later time by automatic data processing apparatus. In FIG. 1 the bottom tooth 14' is formed with an enlarged head and slot 15' is provided with an enlarged recess. When 14' is placed in 15' the key cannot be separated from the main portion by pulling in the lateral direction. Of course, if desired all teeth could be formed in this manner.

FIGS. 6 and 7 illustrate a further embodiment of the invention. In this embodiment the credit card 30 includes a main portion 31 and a key portion 32. These portions include mating field sections 33a and 33b respectively. Information is embossed on the main portion and the key portion at 34 and 35 respectively. This embodiment, unlike the embodiment of FIG. 1, includes a randomly cut edge 36 on the main portion 31 and a matching cut edge 37 on the key portion 32. In this embodiment certain identifying information which could be the name of the owner, his social security number, etc., is embossed on both portions at 38 and 39 and arranged to straddle the cut edges 36 and 37 so that the complete information will appear only after the two portions have been placed together as shown in FIG. 7. In addition, raised nibs such as 40 can be placed on either the main portion or the key portion for automatic data processing purposes.

The embodiment of FIGS. 6 and 7 could also be constructed with the mating fields along the long edge as in FIGS. 1 through 3; and conversely, the embodiment of FIGS. 1 through 3 could be constructed with the mating fields arranged along the short edge of the main portion. In any event, the size of the two portions of any of FIGS. 1–7 could be such that the overall shape of the card, when the two portions are mated together, would be the same as the conventional credit card so that a conventional credit card invoicing machine could be used.

The embodiment of FIG. 1 is particularly suited for an application wherein the projections are individual for each credit card owner, the individual pattern being related to identifying information of the owner. Of course, if desired, the company issuing the credit cards could construct all of them with the mating fields of the same shape. However, if a uniform shape is desired for all credit cards, it would be preferable to employ the embodiment of FIGS. 6 and 7 wherein the individual identifying means is provided not by the shape of the edge but by the embossed information which straddles the edge.

FIGS. 9 through 13 illustrate another embodiment of the invention. In this embodiment there is shown a credit card 50 having a main portion 51 and a key portion 52, these portions including mating field sections 53a and 53b respectively. In this embodiment the field section of key 52 includes the entire upper surface of the key portion 52 and the projections are in the form of raised nibs 54. On the main portion 51 the openings are provided in the form of openings 55 which pass completely through the main portion 51. Information 56 would be embossed on the main portion 51; and the key portion 52 could include an embossed company seal 58, and a head 62 having a slot 63 or a cleavage like 23' of FIG. 2 for the same purpose as described with respect to FIG. 1.

In this embodiment the key portion would fit below the main portion into a specially formed invoicing machine 70 (see FIGS. 13a, 13b and 13c) having a main recess 71 for receiving the main portion 51 and an additional recess 72 for receiving the key portion 52. FIG. 13a shows the two portions properly located in the invoicing machine 70 with the nibs 54 properly located in the openings 55. FIG. 13b illustrates that the main portion 51 would be prevented from lying flat, which would be required for operating the invoicing machine, when the nibs 54 do not fit into the openings 55. FIG. 13c shows an arrangement for preventing printing when the key is not inserted. For taking advantage of this arrangement the embossed information 56 would be placed in the vicinity of the apertures 55. Then, if the key were not present, the main portion 51 would be pushed down into recess 72. A nib 75 could be placed near the outer edge of main portion 51 such that nib 75 would not register unless portion 51 were held flat by the key portion.

In the embodiment of FIG. 9, as in the embodiment of FIG. 1, the projections and openings may be located in accordance with a code identifying the owner by letters or numbers. In this embodiment the fields 53a and 53b are divided into subdivisions 60a and 60b, respectively. However, in this embodiment, it is much easier to arrange the positions within each subdvision transversely to the edge rather than parallel to the edge as indicated at 61. The nibs and openings, as shown in FIGS. 9 through 12 represent the number 724–48–5026, which may be the social security number of the owner. FIG. 11 shows a modification wherein the credit card is identical to the credit card 50 of FIG. 9 except that the nibs 54 are replaced by longer nibs are of sufficient height to pass through the main portion 51 and to engage the invoice and cause a mark to be made thereon for sorting by automatic data processing. The embodiment of FIGS. 9 through 13 can be modified in a number of ways similar to the modifications possible with the embodiment of FIG. 1. For example, "dummy" openings can be provided which, if filled, automatically signal a counterfeit key portion.

The nibs and openings can be coded to represent any information including numbers or letters. Moreover, in a situation where it is not desired to use the raised nibs for purposes of automatic data processing, there is no need for the openings 55 to pass completely through the main portion 51. Rather, they can be constructed in the form of indented recesses formed in the bottom of the main portion. Further, while the field 53a of the main portion is shown along one edge, it is apparent that this field section can be located at any position in the main portion 51. In fact, the field section 53 may be located directly in the area of the embossed information 56. Of course the key 52 could also include a cleavage 23' as shown in FIG. 2.

Numerous other modifications are possible. For example, when a coded arrangement is provided with subdivisions representing items of information, the entire location of the field in any embodiment featured herein can be shifted in one direction or the other for desired subgrouping of accounts as to geographic areas, billing cycles, types of credit risks, etc.

Preferably, the credit cards would be formed of the conventional hard plastic material. However, it might be desirable to construct the key portion of a metal such as brass or stainless steel since it will be carried in the key chain.

Although the invention has been described in considerable detail with respect to preferred embodiments thereof, it should be apparent that the invention is capable of additional and numerous modifications and variations apparent to those skilled in the art.

I claim:

1. A credit card of the type having certain information physically embossed thereon and adapted to be transferred to a surface, the credit card comprising a main portion and a key portion, said main portion being generally flat and thereby adapted to be held in a wallet or the like, said key portion being elongated and also being generally flat, the two portions being substantially the same thickness, and both portions being required to constitute the complete credit card to fill a space within a recess of a credit card receiving machine, one said portion further having predetermined information consisting of a plurality of discrete datum coded on an edge thereof, said edge being divided into a predetermined number of subdivisions, said number being at least equal to the number of said datum, said edge further being formed with a predetermined number of projections thereon, the number and position of the projection or projections within a given subdivision representing the datum of that subdivision, each said subdivision being of sufficient length so that its corresponding projection or projections may be formed at a plurality of discrete positions within said subdivision to represent a specific desired one of a set of datum, said other portion having an edge divided into at least an equal number of subdivisions and further being formed with a predetermined number of recesses, said number of recesses being at least equal to the number of projections, each said recess being positioned within one of said subdivisions and each said projection corresponding to one of said recesses such that each said projection and corresponding recess physically mate with each other only when the two portions are arranged in a common plane with their edges abutting each other and matched in the lengthwise direction of said edges.

2. A credit card according to claim 1 wherein the projections are formed on the key portion and the openings are formed in the main portion.

3. A credit card according to claim 1 wherein said key portion includes a slot formation for properly locating the key portion in a machine for transferring information.

4. A credit card according to claim 1 wherein the said projections are formed on the key portion and extend upwardly above the plane of the generally flat main portion when the portions are properly mated, whereby the projections are adapted to engage the said surface for transferring information thereto.

5. A credit card according to claim 1 including means for preventing separation of the two portions in the plane of the generally flat main portion.

References Cited

UNITED STATES PATENTS

| | | | |
|---|---|---|---|
| 2,305,127 | 12/1942 | Albers | 101—369 |
| 2,626,567 | 1/1953 | Vogt | 101—369 |
| 2,935,941 | 5/1960 | Bradford | 101—369 |
| 3,283,713 | 11/1966 | Wooster | 101—369 |
| 3,350,800 | 11/1967 | Witt et al. | 40—2.2 |
| 3,434,414 | 3/1969 | Wright | 101—369 |
| 3,478,683 | 11/1969 | Hopkins et al. | 101—368 |
| 3,505,954 | 4/1970 | Projansky | 101—369 |
| 3,511,181 | 5/1970 | McGiffen et al. | 101—369 |

EDGAR S. BURR, Primary Examiner

U.S. Cl. X.R.

40—2.2